Patented June 18, 1946

2,402,304

UNITED STATES PATENT OFFICE 2,402,304

MANUFACTURE OF ACTIVATED CARBON

Alan C. Stoneman, Los Angeles, Calif.

No Drawing. Application March 10, 1942,
Serial No. 434,047

6 Claims. (Cl. 252—298)

This invention has to do generally with the manufacture of activated carbons, and particularly with an improved process whereby it is made possible to produce from a raw or partially calcined (i. e. carbonized) carbonaceous material, activated carbon having superior properties in many important and now essential respects, over the activated products obtainable by the usual methods.

While applicable in certain of its aspects to the production of activated carbon from any suitable raw carbonaceous material of the types and compositions commonly employed, the invention is particularly concerned with the making of exceptionally highly active carbon from certain lower density materials such as peach pits, apricot pits, and walnut shells. More specifically the invention is aimed at overcoming certain limitations in the customary processes for producing activated carbons from these materials, that have seriously limited, and within my observations rather completely prevented, such processes from being capable of making products capable of meeting the specifications required for very high quality carbons, e. g. as demanded for use in gas masks.

Experience in the conversion of these lower density shell materials (peach, apricot, and walnut—hereinafter referred to as the "raw shell") into activated carbon, has indicated that at least without adopting special expedients involving such variations from the more straightforward and desirably high quantity production methods, as to render the process virtually impracticable, certain desirably high properties and qualities in the product cannot be obtained. My investigations and considerations of the reasons for the limitations so placed on the quality of the carbon heretofore obtainable from these materials, have led to the discovery that the basic difficulty arises by reason of differences in the properties and characteristics of different particles in the activated product.

The general experience of the industry in attempting to calcine the raw or partially charred shell to a state of maximum adsorptive activity, has been that up to a certain degree or limit (depending upon various factors), increasing activation proceeds by and in accordance with progressive reduction or calcination of the charge. Continued calcination not only fails to increase the activity of the product beyond that degree or limit, but may cause the product to suffer a loss of activity and other desirable properties which it possessed at an intermediate stage. The reason for this condition is believed to be found in a consideration of the fact that different particles in the product have different properties, identifiable for present purposes in accordance with their densities, and that for this reason the particles do not undergo uniform calcination to a state of final correspondence in their adsorptive activities and other properties. Accordingly, progressive calcination up to and beyond a certain stage has the following results, explaining the reasons for a limitation being placed on the efficiency of the product and which cannot be exceeded by virtue of any degree of calcination, no matter how extensive.

Because of their differences in properties, certain particles will respond differently to calcination, some becoming "more activated" than others in that they more readily convert to a porous form of structure which reaches a state of potential maximum adsorptiveness when the pore structure is increased to a maximum without, generally speaking, any appreciable decrease in the size or over-all dimensions of the particle. However, if the particle is subjected to calcination or oxidation after it reaches this state, the effect will be one of decreasing its effective porosity or surface area, by loss of mass or substance converted to gas, and as a consequence the potential adsorptiveness of the particle suffers accordingly. At the same time, other particles may be undergoing conversion in the direction of increasing potential activity or adsorptiveness, but a ratio is reached between the quantities of the particles suffering decreasing activity (surface area) as against those increasing in activity, at a point beyond which the activity of the mass will not increase. And as stated above, this maximum state of activity is insufficient to meet the most desirable requirements of higher test carbons, as for use in gas masks.

I have found that in a mass of the activated shell carbon, particles of greater density will have considerably higher states of activation than the lowest or lower density particles, notwithstanding the fact that all such particles may be of the same size, i. e. corresponding to the same screen mesh size. Moreover, the essential properties of such products are found to differ considerably, and at least in many instances, over substantially wide ranges. Accordingly, it is considered that by depleting the mass with respect to particles of lower density and less desirable qualities, the average state of activity of the residual or remaining higher density particles, can be raised to values rendering the resultant product capable of meeting specifications well in excess of those otherwise obtainable.

The soundness of these determinations has been established by segregation of an activated peach pit carbon, prepared by methods of activation, to be regarded as typical, described briefly as follows.

The raw shell, which may have been left in coarse condition, or crushed to a fineness passing through a U. S. S. 4-mesh sieve and retained on a 10-mesh sieve, is subjected to preliminary calcination within a rotary kiln and in a substantially reducing atmosphere. The shell may be charred in the kiln at relatively low temperature, in the neighborhood of 1000° F., for about thirty minutes, producing a charred material having an average density (average of all its particles) of about 0.40. It is contemplated that a charred material suitable for the purposes of the invention may have a density ranging between, say, 0.35 and 0.52, with the densities of the individual particles ranging between 0.18 and 0.55. As herein used, the terms "density" and "specific gravity" are defined as the weight in grams per unit of volume of charcoal particles which will pass through a U S. S. 12-mesh sieve, and are held on a U. S. S. 16-mesh sieve The partially calcined or charred material, sized to pass through a 10-mesh sieve and be retained on a 12-mesh sieve, is subjected to a second-stage calcination in a rotary or other kiln at a temperature between 1400 to 1850° F. over a period of time, say from 4 to 24 hours, depending upon the temperature of calcination, degree of activation desired in the product, and various possible modifying operation conditions. Preferably, the second-stage calcination is conducted in an atmosphere containing superheated steam or carbon dioxide, with or without complete exclusion of air. In this connection it may be mentioned that the more highly oxygenated atmospheres, or the higher temperatures of calcination, may considerably increase the rate and completeness of the carbon activation, but at the expense of a decrease in the average density and desirable adsorptive properties of the product. By separation of the lower density particles, as later described, it is possible in the interests of maximum quantity production of high specification product, to conduct the calcination in an oxygenated atmosphere, or at abnormally high temperatures, and obtain an exceptionally high quality product notwithstanding the tendency of these conditions to result normally in a low quality product.

Generally speaking, the activated product obtained by calcination of the char may have an average density ranging between 0.28 and 0.40, with a particle size corresponding to the mesh area of from 12 to 16 U. S. S. sieve. The typical product to be considered had a particle size within this range and a density of 0.289. The activity of the carbon, determined by the usual test with carbon tetrachloride, measured 13 minutes, 45 seconds, and its heat of wetting, also determined by the standard test, measured 8.1 per unit volume. These values for the properties of the activated carbon mass, and the values for corresponding properties of designated fractions (by volume) of the mass, are shown in the table below.

Although the invention broadly contemplates the use of any suitable method or apparatus for separating or classifying particles of the mass in accordance with their differences in densities, it is preferred to use a type of separator, (e. g. the well-known Stebbins dry concentrator) of which many are known in the art, in which the carbon particles are segregated in the presence of one or more streams of air. In effecting the separations indicated in the table, the carbon mass was passed over a dry concentrator in the form of a horizontally agitated table from which the different density portions were removed from different locations after segregation by upwardly jetted air streams. It is to be clearly understood that the purpose of the separation is not to classify the material according to particle sizes, but rather according to differences in densities of particles which may be of the same size.

*Table*

| Material | Density | Activity (abs. of $CCl_4$) | | Heat of wetting (per unit volume) |
| --- | --- | --- | --- | --- |
| | | Min. | Sec. | |
| Activated char | 0.289 | 13 | 45 | 8.1 |
| 20% (by volume) | 0.193 | 9 | 25 | 7.1 |
| 59% (by volume) | 0.266 | 12 | 20 | 8.5 |
| 8% (by volume) | 0.320 | 13 | 30 | 9.3 |
| 8% (by volume) | 0.360 | 14 | 40 | 9.5 |
| 5% (by volume) | 0.480 | 16 | 10 | 10.0 |

The data presented in the table above show clearly the relatively low average density of the lighter particles representing 20% by volume of the mass, and most significantly, the low adsorptive value of such low density particles, indicated by a heat of wetting value of 7.1 per unit volume, as against values as high as 10 per unit volume for particle densities running as high as 0.48. The activities of the separated portions as measured by their adsorptiveness of carbon tetrachloride, show higher values in the higher density particles.

From the foregoing, it will be appreciated that the particle composition of a given activated shell carbon may be investigated as to sizes and proportions within given size ranges, and the corresponding values obtained for the adsorptive activity and heat of wetting properties. From such information, a final product may be obtained to meet high specifications with respect to one or more of the properties listed in the table, by separating the lower density particles from the material and governing the range of the separated low densities, in accordance with the properties to be possessed by the final product. Typically, the proportion of low density particles to be separated may amount to about 20% by volume of the particle mass, giving the residual or higher density product increased activity in excess of about 14 minutes and a heat of wetting not lower than 8.5 per unit volume.

While the invention is directed primarily to the production of an activated carbon lacking its normal or initial low density particles, it may be mentioned that the separated low densities need not necessarily be regarded as a useless or waste material, in that the purposes of many industrial processes for which activated carbon may be used, may be served by the lower density particles produced as described.

Consideration has been given in the foregoing discussion of the invention, primarily to the production from an activated carbon of relatively low adsorptive activity, a segregated final product material characterized by its relatively high adsorptive activity and capacity. The present type of process also is applicable to the achievement of a somewhat different objective, and for purposes where the state of activation of the final product may be of less or secondary importance. The utility and efficiency of activated carbons for use in many industrial purposes can greatly be enhanced by careful segregation out of a relatively low average density activated carbon which includes particles of wide density range, a relatively narrow density range of particles having, by reason of the narrowness of such range, considerably greater uniformity in properties such as density and adsorptive activity. In any given instance, the density range of the particles of which the segregated fraction or portion of the entire mass is composed, may be predetermined to meet the density requirements of the particular industrial process for which the segregated product is to be used. Typically, such a product closely segregated with respect to the density range of its particles may serve with efficiency considerably greater than the activated carbons heretofore used, for the purposes of ore flotation processes.

I claim:

1. The method of treating finely divided activated carbon comprising relatively high density and low density activated particles that includes removing from said carbon relatively light particles whose average specific gravity is lower than about 0.266 by separating the carbon particles in accordance with their relative densities, and thereby obtaining a higher density residual product having substantially increased adsorptive activity.

2. The method of treating finely divided activated carbon comprising relatively high density and low density activated particles and having an average heat of wetting value lower than 8.5 per unit volume, that includes removing from said carbon relatively light particles whose average specific gravity is lower than about 0.266 by separating the carbon particles in accordance with their relative densities, and thereby obtaining a residual higher density product having a heat of wetting value in excess of 8.5 per unit volume, and an adsorptive activity by the carbon tetrachloride test of at least about 14 minutes.

3. The method of treating finely divided activated carbon comprising relatively high density and low density activated particles and having a specific gravity between 0.28 and 0.40 and a heat of wetting value lower than 8.5 unit volume, said method including the steps of removing from said carbon particles whose average specific gravity is lower than about 0.266 by separating the carbon particles in accordance with their relative densities, and thereby obtaining a higher density residual product having an average heat of wetting value in excess of 8.5 per unit volume, and an adsorptive activity by the carbon tetrachloride test of at least about 14 minutes.

4. The method of treating charred finely divided carbonaceous material having a specific gravity between 0.35 and 0.52, said method comprising the steps of carbonizing said material to produce finely divided activated carbon containing relatively low density and high density activated carbon particles and having relatively low adsorptive activity, and then removing from said carbon low density particles by separating the carbon particles in accordance with their relative densities, and thereby obtaining a higher density activated residual product having substantially increased adsorptive activity.

5. The method of treating charred finely divided carbonaceous material, said method comprising the steps of carbonizing said material to produce finely divided activated carbon containing relatively low density and high density activated carbon particles and having relatively low adsorptive activity and a density between 0.28 and 0.40, and then removing from said carbon low density particles by separating the carbon particles in accordance with their relative densities, and thereby obtaining a higher density activated residual product having substantially increased adsorptive activity.

6. The method of treating charred finely divided carbonaceous material having a specific gravity between 0.35 and 0.52, said method comprising the steps of carbonizing said material to produce finely divided activated carbon containing relatively low density and high density activated carbon particles and having relatively low adsorptive activity and a density between 0.28 and 0.40, and then removing from said carbon low density particles by separating the carbon particles in accordance with their relative densities, and thereby obtaining a higher density activated residual product having a heat of wetting value in excess of 8.5 per unit volume.

ALAN C. STONEMAN.